INVENTORS
ARTHUR STANLEY PEARSON
DAVID JULIAN FORD
BY Philip E. Parker
ATTORNEY

Sept. 15, 1970　　　A. S. PEARSON ET AL　　　3,528,693
BACKING STRIP FOR ATTACHING UPHOLSTERY TO ARTICLES SUCH
AS CHAIRS MADE OF EXPANDED POLYSTYRENE
FOAM OR LIKE MATERIAL Filed Feb. 14, 1969　　　　　　　　　2 Sheets-Sheet 2

INVENTORS
ARTHUR STANLEY PEARSON
DAVID JULIAN FORD
BY Philip E. Parker
ATTORNEY

United States Patent Office 3,528,693
Patented Sept. 15, 1970

3,528,693
BACKING STRIP FOR ATTACHING UPHOLSTERY TO ARTICLES SUCH AS CHAIRS MADE OF EXPANDED POLYSTYRENE FOAM OR LIKE MATERIAL
Arthur Stanley Pearson, Sherwood, and David Julian Ford, Stapleford, England, assignors to United-Carr Incorporated, Boston, Mass., a corporation of Delaware
Filed Feb. 14, 1969, Ser. No. 799,169
Claims priority, application Great Britain, Feb. 20, 1968, 8,189/68
Int. Cl. F16b 1/00, 5/00, 15/06
U.S. Cl. 287—189.36                          3 Claims

ABSTRACT OF THE DISCLOSURE

A backing strip for attachment to articles made of expanded polystyrene foam is formed as a one-piece moulding of synthetic plastics including a base and a plurality of integral studs which are forced into the expanded foam, the base of the strip serving as means for attaching upholstery.

---

This invention relates to a backing strip for attachment to an article made of expanded polystyrene foam or like material.

Material such as expanded polystyrene foam is being used to an increasing extent for making chairs and other articles of furniture, but difficulty has been found in attaching upholstery to such articles as when conventional fastening means such as screws are used they cause the material to break up into granular form at the point of entry and have no holding power to retain the upholstery units.

The present invention provides a backing strip for attachment to an article made of expanded polystyrene foam or like material, comprising a one-piece moulding of synthetic plastics including a base having a plurality of stud-like elements projecting from one face, each having a pointed end and a plurality of lateral projections spaced axially of the stud-like element, the backing strip being adapted, in use, to be attached to the article by forcing the stud-like elements into the polystyrene foam or like material wherein the lateral projections serve to retain it, the base of the strip serving as a means for attaching upholstery.

To enable the invention to be fully understood, it will now be described, by way of example, with reference to the accompanying drawings in which.

Figure 1:
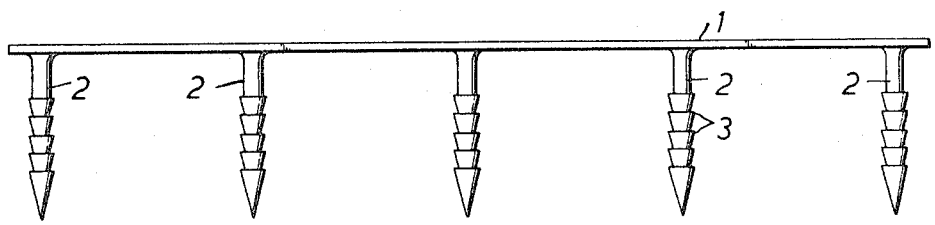
FIG. 1 is a side elevation of a backing strip according to one embodiment of the invention.
Figure 2:
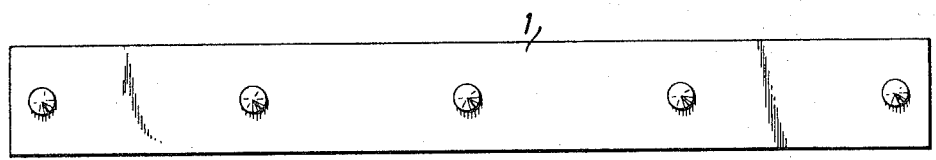
FIG. 2 is a plan view.
Figure 4:
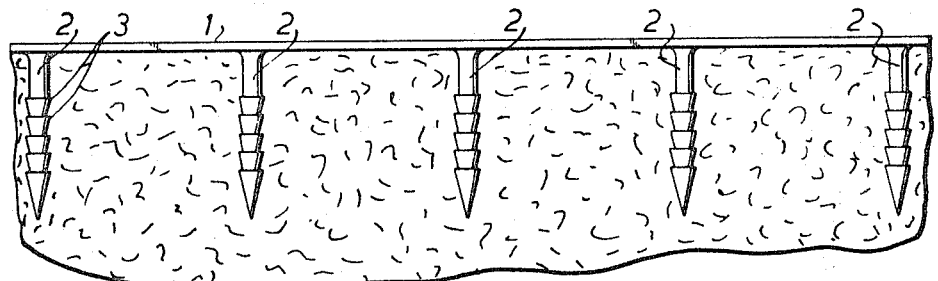
FIG. 4 is a side view showing the backing strip attached to part of an article made of expanded polystyrene foam.
Figure 3:
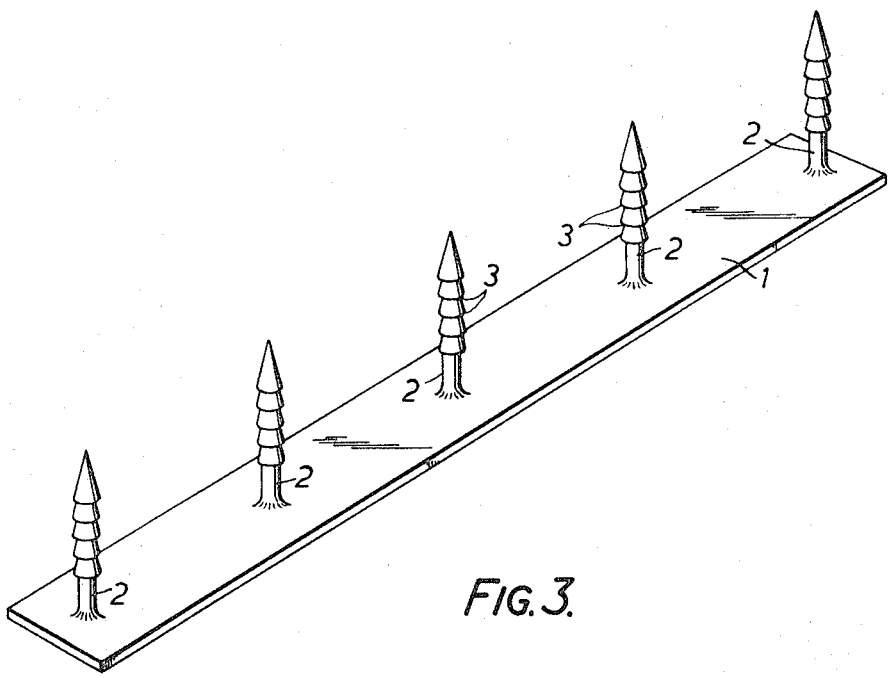
FIG. 3 is a perspective view.

As illustrated in the drawings, the backing strip comprises a one-piece moulding of synthetic plastics including a flat base 1 having a plurality of stud-like elements 2 projecting integrally from one face, the free ends being pointed. The stud-like elements are equi-spaced longitudinally of the base and each is formed with a series of laterally projecting shoulders 3 facing towards the base and having relatively sharp edges.

The strip is secured to an article of manufacture such as the seat or back of a chair made of expanded polystyrene foam by positioning the base over the surface of the article and exerting pressure to force the stud-like elements into the polystyrene foam material. The pointed ends of the stud-like elements readily penetrate into the material and the stud is insertable with little or no break up of the polystyrene material and when fully inserted the shoulders 3 serve to retain the backing strip securely in assembly.

The base of the backing strip will lie flush in abutment with the adjacent face of the article and serve as a convenient means for securing the units of upholstery which may be secured by any suitable fastening means. It will be understood that any desired number of backing strips will be attached to the article to be upholstered and they may be of any desired length and width.

As an alternative to the shoulders 3, the stud-like elements could be formed with a plurality of barbs, the free ends of which are directed towards the base 1.

The backing strip may be formed as a continuous length which is cut into any desired length as required.

The term "strip" is intended to include a sheet capable of extending over a substantial area of the surface of the article to which it is to be secured.

We claim:

1. An assembly comprising an article formed of expanded polystyrene foam material and a backing strip, said backing strip being of unitary molded plastic construction, said backing strip having a base which is particularly adapted to serve as a means for attaching upholstery to the polystyrene material and a plurality of stud-like elements integrally joined to and projecting outwardly from one face of said base, each of said stud-like elements having a pointed end remote from said base to facilitate insertion of said stud-like elements into said polystyrene article, and a plurality of lateral projections spaced axially thereof between said pointed end and said base, said stud-like elements being embedded in said polystyrene article and said one face of said base lying flush against an outer surface of said article, said backing strip being securely retained in assembly with said article by the interengagement of said lateral projections and said polystyrene material.

2. An assembly according to claim 1 wherein said lateral projections on said stud-like elements define shoulders facing towards the said base of said backing strip.

3. An assembly according to claim 1 wherein said lateral projections have frusto-conical faces directed toward the pointed ends of said stud-like elements.

References Cited

UNITED STATES PATENTS

| 887,532 | 5/1908 | Sherman. | |
|---|---|---|---|
| 2,025,961 | 12/1935 | Stone | 85—21 |
| 2,680,393 | 6/1954 | Howell. | |
| 3,071,827 | 1/1963 | Van Buren | 52—363 X |
| 3,355,978 | 12/1967 | Flintoft | 52—363 X |

FOREIGN PATENTS

| 1,225,366 | 9/1966 | Germany. |
|---|---|---|
| 371,918 | 4/1932 | Great Britain. |
| 916,048 | 1/1963 | Great Britain. |

RAMON S. BRITTS, Primary Examiner

U.S. Cl. X.R.

24—152; 52—362; 85—13, 21